July 21, 1964  E. C. HERBKERSMAN  3,141,356
INDEXING MECHANISM
Filed Sept. 26, 1961  5 Sheets-Sheet 3

INVENTOR.
EARLE C. HERBKERSMAN
BY
John H. Leonard,
his ATTORNEY.

July 21, 1964 E. C. HERBKERSMAN 3,141,356
INDEXING MECHANISM
Filed Sept. 26, 1961 5 Sheets-Sheet 4

INVENTOR.
EARLE C. HERBKERSMAN
BY
John H. Leonard
his ATTORNEY.

United States Patent Office 3,141,356
Patented July 21, 1964

3,141,356
INDEXING MECHANISM
Earle C. Herbkersman, Parma, Ohio, assignor to The Pipe Machinery Company, Wickliffe, Ohio, a corporation of Ohio
Filed Sept. 26, 1961, Ser. No. 140,751
7 Claims. (Cl. 74—822)

This invention relates to an indexing mechanism, and particularly to an indexing mechanism for indexing heavy structures of which the starting and stopping involve large inertial forces and stresses.

The indexing mechanism is suitable for indexing heavy structures or members which are driven either lineally or curvilinearly. For purposes of illustration, it is described as applied to a rotatable heavy-duty turret arranged to present workpieces to successive stations arranged about the turret axis, such as described in my copending application, Serial No. 133,718, filed August 24, 1961, and entitled "Multi-Station Machine Including Work Holding and Positioning Apparatus."

The mechanism is arranged to start the heavy structure smoothly, accelerate it rapidly to the maximum speed, decelerate it smoothly and rapidly by gradually increasing yieldable opposing force until it is in the operating position, then stopping it, without jerking, vibration, and oscillation, and precisely indexing and latching it in the operating position.

While the structure is described in connection with a rotary turret, its use for other types of structures, such as rotary furnaces and other heavy duty equipment requiring intermittent indexing will be apparent from the illustrative example wherein reference is made to the drawings, in which:

FIG. 5 is a fragmentary horizontal sectional view taken on the line 5—5 in FIG. 4;

Figure 1:
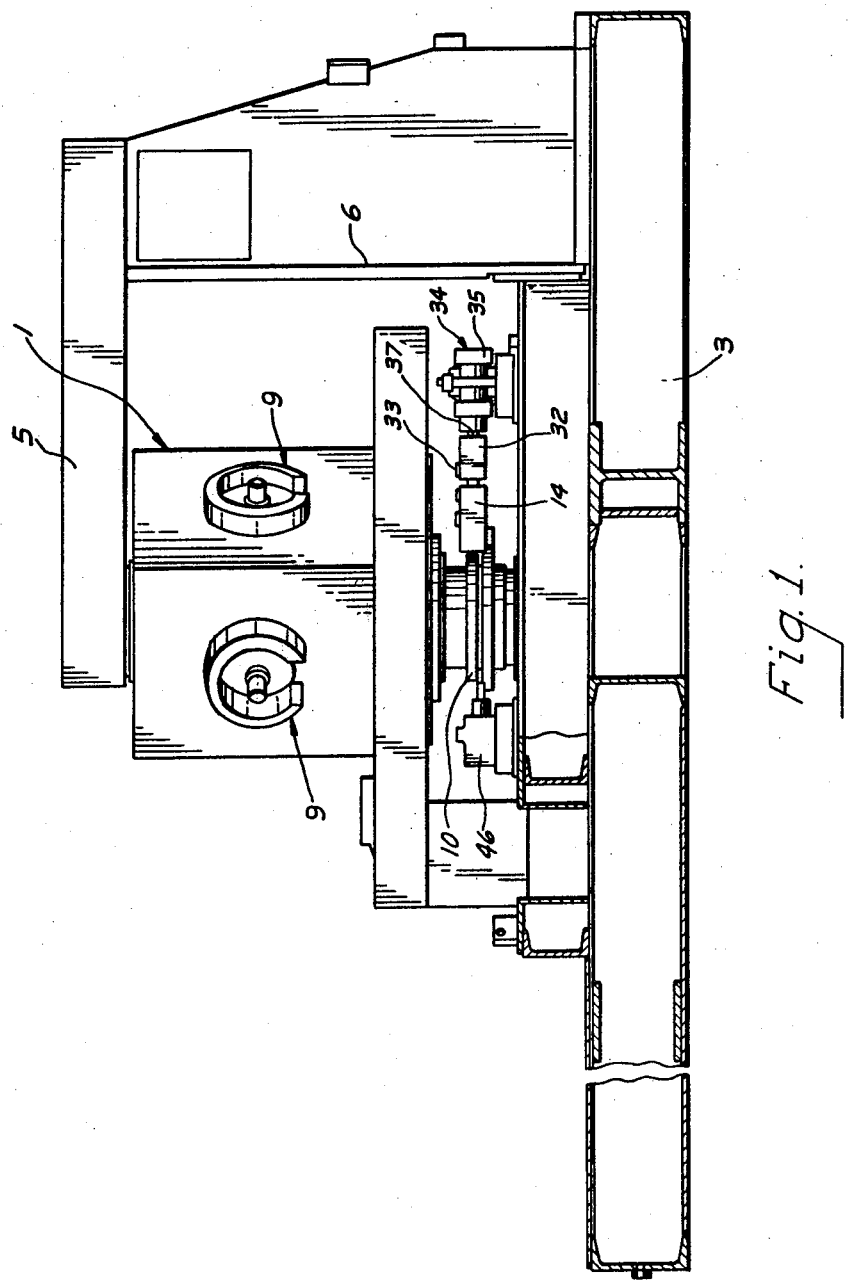
FIG. 1 is a front elevation, partly in section, of a machine turret with the indexing mechanism of the present invention arranged for indexing the turret.
Figure 2:
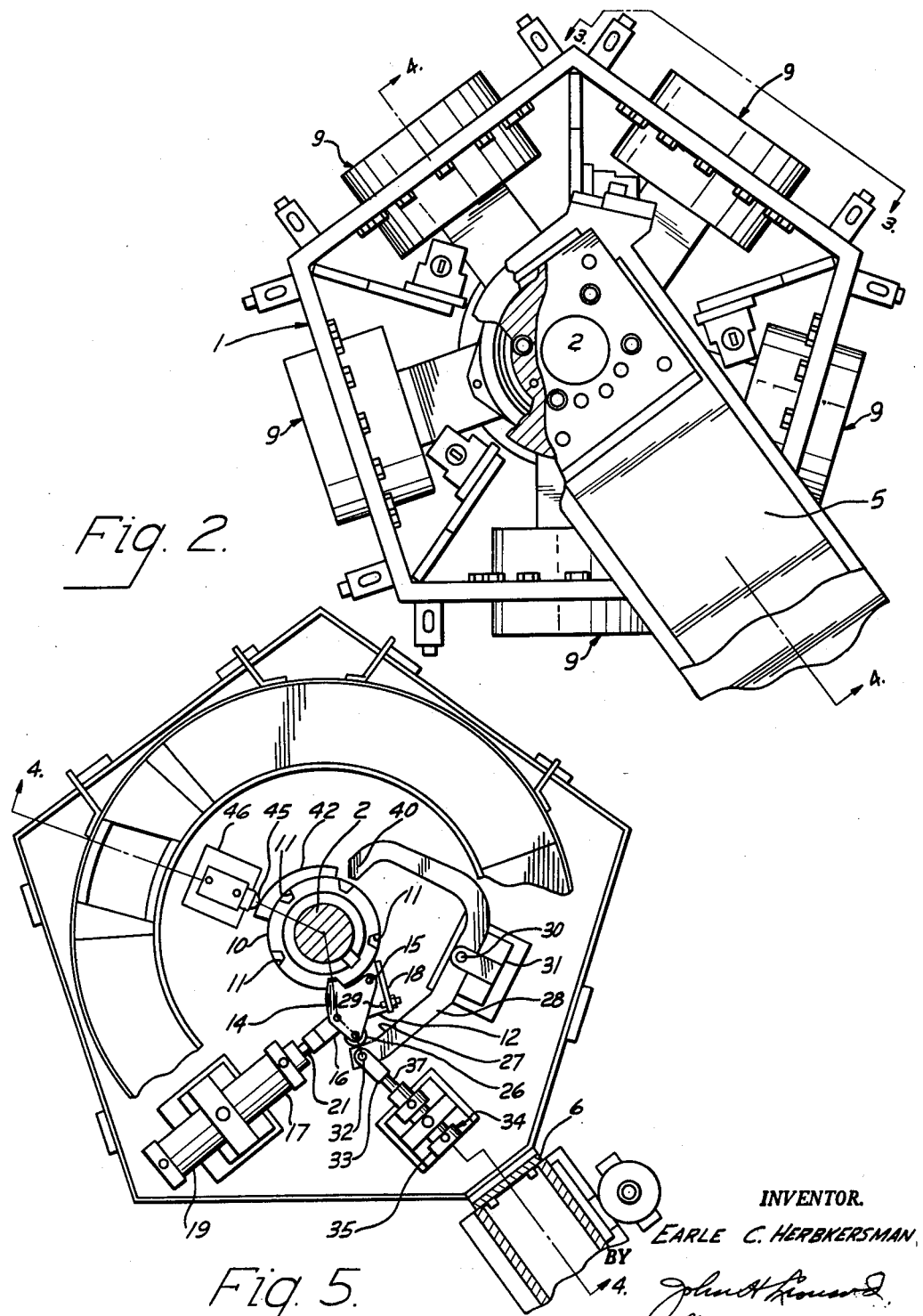
FIG. 2 is a fragmentary enlarged top plan view of the structure illustrated in FIG. 1.
Figure 3:
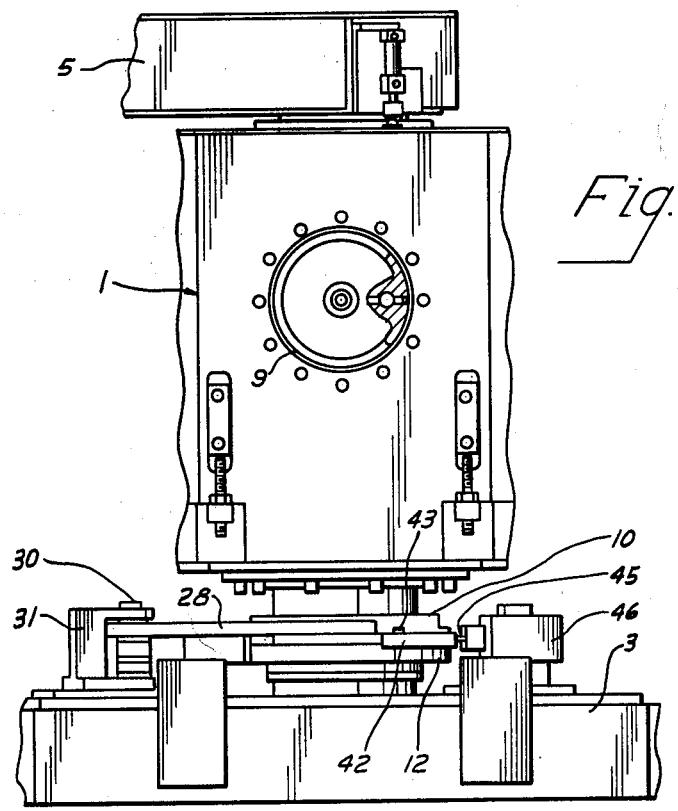
FIG. 3 is an elevational view of the structure illustrated in FIG. 2, as viewed from lines 3—3 in FIG. 2.

Referring to the drawings, the structure to be indexed is shown as the turret of the machine illustrated in my above identified copending application. The turret 1 is supported for rotation about an upright axis by a pintle 2 which is mounted in upright position on a base frame 3. The pintle 2 has an upper reduced portion 4 which is engaged by a suitable stabilizing arm 5 which, in turn, is connected to the frame 3 by an upright frame portion 6. The turret is supported on the pintle by suitable anti-friction bearings 7. The turret supports five heavy chuck supporting carriages 8 and preloading mechanisms, indicated at 9, for preloading the chucks of the carriages. In the structure shown illustratively, the turret with the chuck supporting carriages weighs substantially four tons. For the reasons set forth in the identified application, it is desirable that the turret be started from the stationary position smoothly, rapidly accelerated to a maximum speed, then decelerated rapidly while yieldably opposed by gradually increasing yieldable opposing force until it is brought to a full stop, and then precisely indexed in the stopped position. For this purpose, the index mechanism now to be described is employed.

For rotating and indexing the turret 1, an indexing plate 10 is connected to the base of the turret for rotation therewith about the axis of the spindle 2. The indexing plate 10 is provided with a plurality of circumferentially spaced radially open indexing notches 11, corresponding in number to the machining stations to be employed in connection with the machine, and which, in the illustrative example, is five.

Mounted on the base of the spindle 2 is an oscillating plate 12 which is oscillatable about the spindle axis in suitable bearings 13. Pivotally mounted on the plate 12 for oscillating movement, relative to the plate 12 about an upright axis, is a driving member 14. The member 14 is connected to the plate 12 by a pivot 15 and is pivotally connected to a yoke 16 which is driven by a reversible piston and cylinder assemblage 17. A stop support flange 18 is provided on the plate 12 for supporting an adjustable stop, later to be described, which limits the swinging of the member 14 about its pivot 15 in a counterclockwise direction relative to the plate 12.

Figure 6:
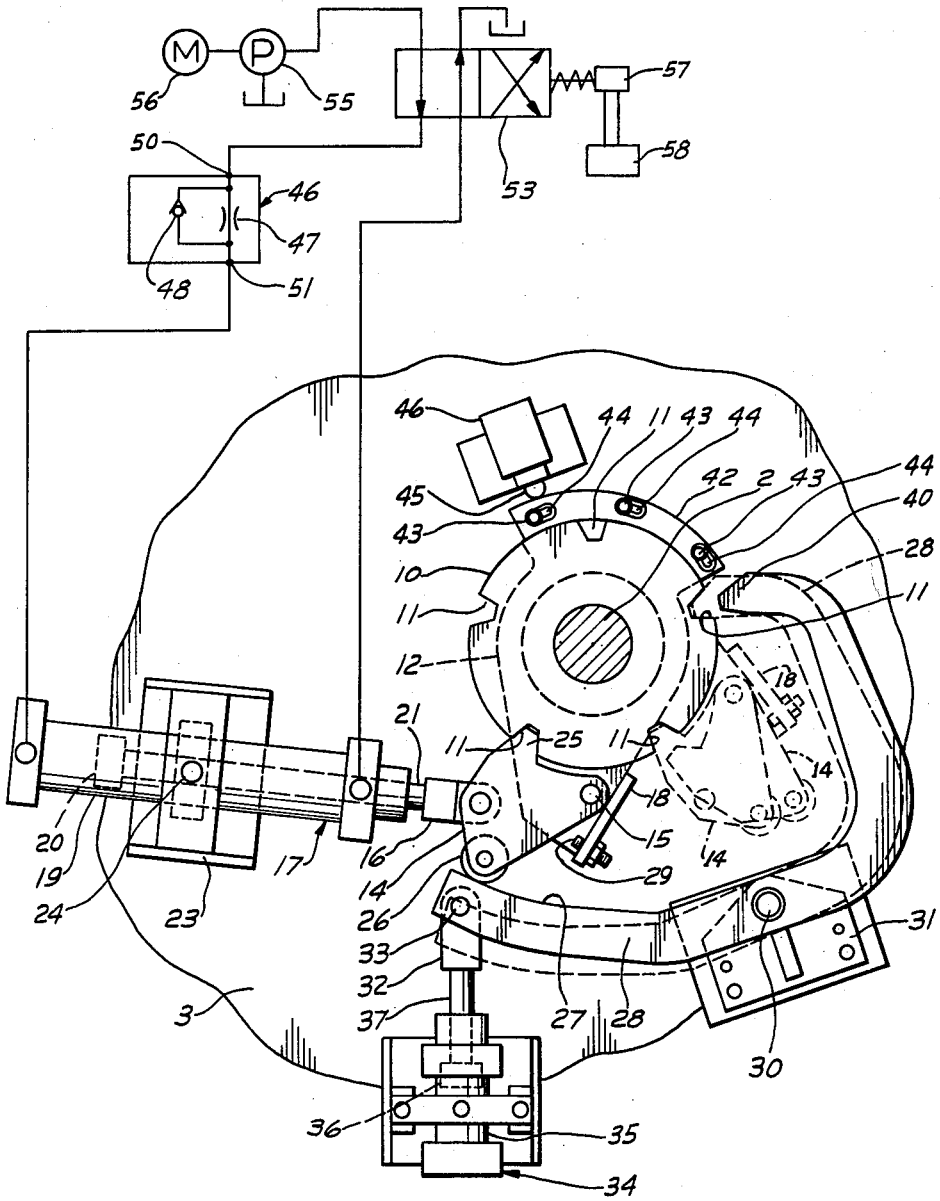
FIG. 6 is an enlarged fragmentary plan view, similar to FIG. 5, showing the indexing mechanism and illustrating its operating positions in greater detail.

The assemblage 17 includes a cylinder 19 in which is reciprocable a piston 20 having a piston rod 21 which is pivotally connected to the member 14 by the yoke 16. The cylinder is mounted on a bracket 23 on the machine frame, for rocking about an upright axis 24. The member 14 has an indexing detent 25 which is adapted to engage in the notches 11 in the plate 10 for applying force to the plate circumferentially for swinging the turret when the assemblage 17 is retracted from extended position. In order to permit the detent 25 to cooperate with the notches 11 for driving the turret upon retraction of the assemblage 17, the driving member 14 is provided with a cam roller 26. The cam roller 26 operates against a cam surface 27 on a precise indexing and latching rocker 28 when the rocker 28 is out of its indexing and latching position, as illustrated in solid lines in FIG. 6. The assemblage 17 is moved to extended condition while the rocker 28 is in the latching position, as illustrated in dotted lines in FIG. 6.

As the assemblage 17 extends, it swings the driving member 14 counterclockwise about the pivot 15 on the plate 12, until the member 14 strikes an adjustable stop 29 on the flange 18. Thereupon, both the member 14 and the plate 12 swing together about the axis of the turret in a counterclockwise direction to a position in which the member 14 is to start indexing. This position is indicated in dotted lines in FIG. 6, wherein the member 14 is shown in position for engagement of its detent 25 with the adjacent notch 11 of the indexing plate 10. During this counterclockwise movement, the rocker arm 28 is in the dotted line position in FIG. 6 in which it is in latching engagement with the plate 10. Consequently, the roller 26 is out of engagement with the cam surface 27. The rocker 28 is pivotally mounted on a pivot 30, supported by a bracket 31 fastened to the machine frame, for rocking about an upright axis. It is connected by a suitable yoke 32 and pivot 33 to a reversible piston and cylinder assemblage 34. This assemblage comprises a cylinder 35 and a piston 36 having a rod 37 which is connected to the yoke 32.

The end of the rocker 28 opposite from the pivot 33 has a detent 40 which, as the assemblage 34 is retracted, enters the notch 11 adjacent to it and is drawn into seating position therein. Each notch 11 has side walls which diverge outwardly from the turret axis. The side walls of the detent 40 are complementary thereto. As a result, as the detent 40 is forced into a notch 11 by the assemblage 34, it can cam and swing the turret slightly and draw the turret very precisely into position and hold it there accurately. As mentioned, while the detent 40 is seated in a notch 11 and the cam surface 27 is out of contact with the cam roller 26, the member 14 is moved to the starting position by extension of the assemblage 17.

To index the turret, the assemblage 34 is extended and rocks the rocker arm 28 to unseat the detent 40. While the rocker arm is held securely in the position in which the detent 40 is fully withdrawn from the notch 11, the driving member 14 is pulled on its driving stroke by contracting the assemblage 17. Since the arm is held securely in this released position, the cam surface 27 is held precisely in proper position for cooperation with the cam roller 26. Retraction of the assemblage 17 swings the driving member 14 clockwise about the pivot 15, thus causing the detent 25 of the driving member to enter the notch 11 adjacent to it and seat thereon.

Coaction of the cam surface 27 and the cam roller 26 maintain the detent 25 seated in its associated notch 11, so that the member 14 and the plate 12 swing as a unit about the turret axis in a clockwise direction and rotate the turret clockwise about the axis of the spindle 2. The member 14 rotates the turret through a full stroke of the assemblage 17.

The turret is massive and, accordingly, after it has gained momentum and before it reaches its indexed position, gradually increasing resistance to its rotation is applied so that it can be brought to rest smoothly. To this end, the assemblage 34 and the rocker 28 are so arranged that when the assemblage 34 has been fully extended and thereby has swung the rocker 28 to its final position, as indicated by the solid line in FIG. 6, the cam surface 27 is disposed closer to the axis of the turret than is the path defined by the cam roller 26 as the member 14 is moved by the assemblage 17 to rotate the turret in a clockwise direction. This wedge surface approaches progressively closer to the turret axis in the direction of indexing. Accordingly, as the assemblage 17 contracts and moves the cam roller 26 clockwise during indexing, the roller is wedged progressively against the cam surface 27. This forces the rocker 28 to swing counter-clockwise against the yieldable resistance of the assemblage 34 progressively more as the turret approaches indexed position. The yieldable resistance to movement of the rocker 28 imposed by the assemblage 34, in turn, imposes on the cam roller 26 a very heavy force which is in opposition to, and must be overcome by, the dynamic inertia force of the turret. In this manner, the assemblage 34, acting through the cam surface 27 on the roller 26, contributes to the initiation of the slow down of the rotation of the turret in the indexing direction, and progressively reduces the speed of rotation of the turret as the turret approaches the indexed position. This resistance also provides a safety feature for slowing down the turret in event other controls should fail. The forces involved are considerable. For example, the turret may weigh in excess of two tons, and is started, accelerated, decelerated through a total of 72°, and stopped, all within a fraction of a second.

In this connection, it is to be noted that the amount of pressure fluid displaced by the reaction of the cam roller 26 with respect to the assemblage 34 is very small in volume, because the fluid pressures employed are very high. Therefore, though the head end of the assemblage 34 is connected to the pressure side of the pump which is also connected to the rod end of the assemblage 17 at this particular time in the cycle of operation, the pressure fluid thus displaced from the head end 34 does not materially effect the operation of the assemblage 17. Instead, the volume and pressure of fluid are dissipated temporarily by the inherent slight compressibility of the pressure fluid and the slight expansion of the pipe and hose lines leading from the pump to the assemblage 34. Additional throttling in the line can be employed, if desired, however.

With five stations, each indexing operation rotates the turret through an angle of 72°. Upon completion of the stroke by the assemblage 17, the piston and cylinder assemblage 34 is reversed, thus removing the cam track 27 from the cam roller 26. This releases the driving member 14 for subsequent swinging about the axis of the pivot 15 to disengage its detent 25 from the associated notch 11 on the plate 10, upon the occurrence of the next extension stroke of the assemblage 17. At the same time, the detent 40 is firmly pressed into the notch 11 adjacent to it, thus very precisely positioning the turret in the proper rotated position about the axis of the pintle and latching it in that position.

Figure 7:
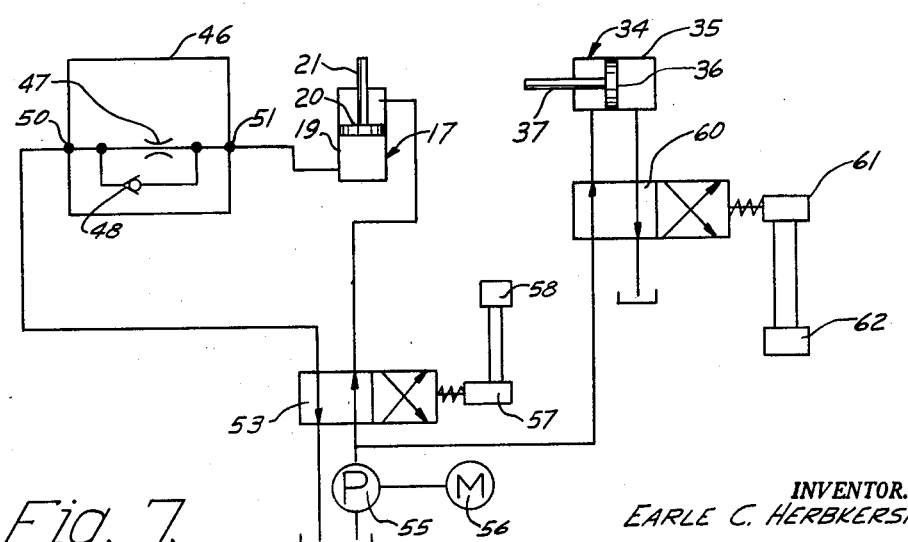
FIG. 7 is a hydraulic flow diagram illustrating the manner of supplying and controlling the pressure fluid to the hydraulic assemblages of the mechanism.
Figure 4:
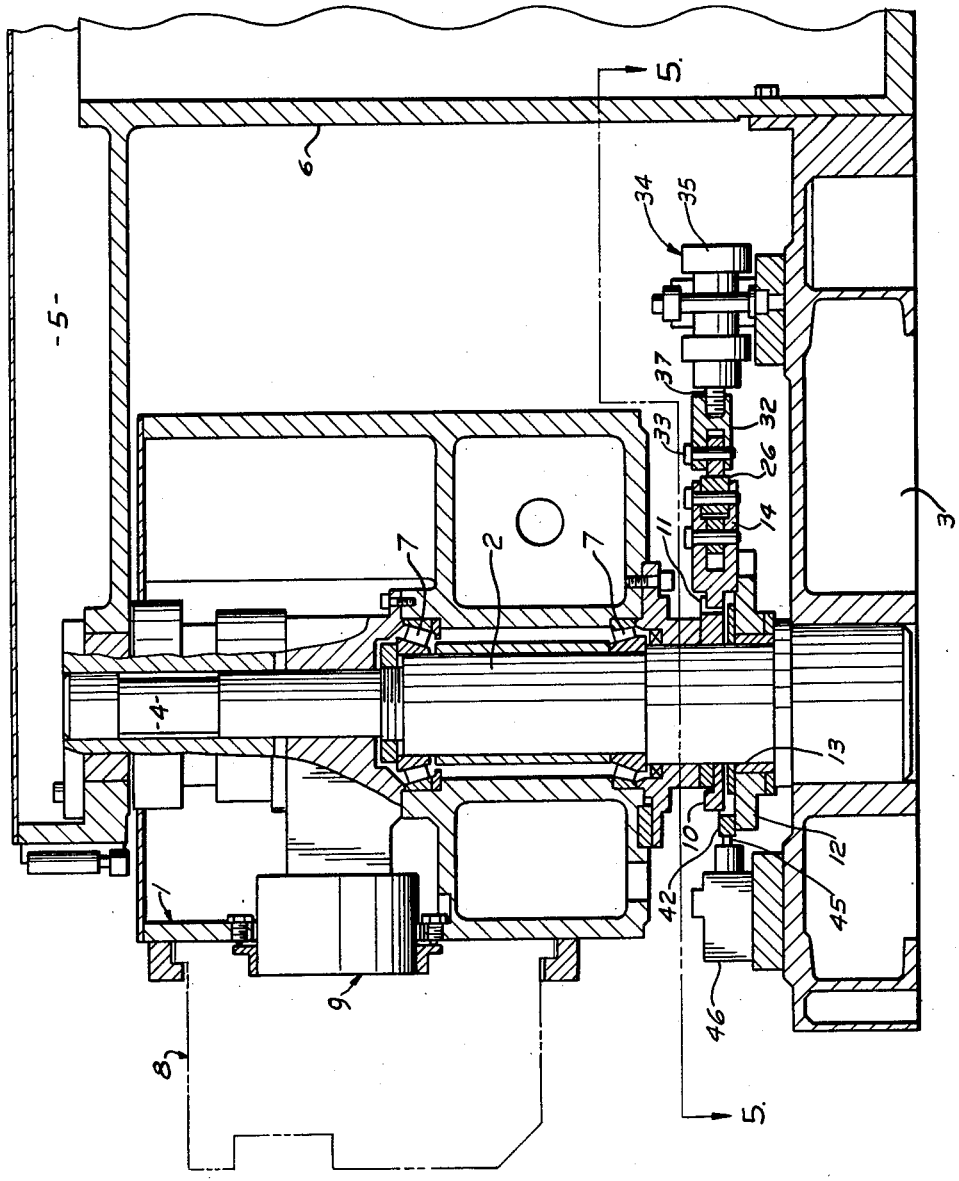
FIG. 4 is an enlarged fragmentary vertical sectional view, partly in elevation, taken on the line 4—4 in FIGS. 2 and 5.

In order to assure prompt starting, rapid advance, and prompt, but cushioned, stopping of the turret, a suitable peripheral cam 42 is mounted on the plate 12 for rotation therewith. The cam is connected by suitable bolts 43 operating in elongated slots 44 so that the cam 42 can be adjusted circumferentially about the axis of the spindle 2 relative to the plate 12. The cam 42 operates a cam follower 45 of a throttling valve 46. As indicated in the hydraulic flow diagram in FIG. 7, the valve 46 has an adjustable throttling orifice 47, and a bypass 48. The degree of throttling by the orifice is varied by the setting of the cam follower by the cam. The bypass is arranged to permit the free flow of pressure fluid to the head end of the cylinder 19 and to cause the return flow from the head end to a sump, upon retraction of the assemblage 17 by admission of pressure fluid to its rod end, to pass through the throttle. The throttling valve 46 has ports 50 and 51, the port 50 being connected to a reversing valve 53 and the port 51 being connected to the head end of the cylinder 19. The throttling orifice 47 is arranged to be fully closed when the turret reaches its proper indexed position; for example, when the assemblage 17 reaches its fully retracted position. The change from open throttle to fully closed throttle is gradual throughout the driving of the turret in the indexing direction.

Another pipe line leads from the rod end of the assemblage 17 to the reversing valve 53.

Thus, at each operation, the assemblage 17 starts the turret rapidly, swings it through substantially 72°, accelerating it through the first 24°, gradually slows it down along the remainder of its path, and brings it to a gradual cushioned stop substantially in the rotated indexed position desired.

When the turret reaches the indexed position, the assemblage 34 is retracted to cause the rocker 28 to engage its detent 40 with the adjacent notch 11 of the plate 10 and thereby position the turret precisely and hold it precisely in indexed position.

For supplying power to the assemblages 17 and 34 for operating them, a suitable pump 55 driven by a motor 56 is provided. The pump is connected to the reversing valve 53 which, in one position, supplies pressure fluid to the rod end of the assemblage 17 and vents the head end, and in the other position supplies pressure fluid to the head end and vents the rod end. The valve 53 is operated by a solenoid 57 and is self-restoring. It may be controlled by a suitable remote switch 58 under the control of an operator.

Control of flow of pressure fluid from the pump 55 to the assemblage 34 is controlled by a reversing valve 60 operated by a solenoid 61 under the control of a switch 62. If desired, the switch 62 may be a limit switch so positioned that when the member 14 has indexed the turret fully to the proper position, it will operate to cause the valve 60 to supply pressure fluid to the rod of the assemblage 34 to retract the piston 36 and rock the arm 28 counterclockwise to seat the detent 40 in a notch 11.

The operation of the control switches is dependent upon the requirements of the particular indexing situation. The switches may be manually operated, if desired.

It is apparent from the foregoing description that an effective indexing mechanism has been provided which not only is capable of starting and stopping heavy loads, but of doing so smoothly, without sudden starts, stops, and severe strains and vibrations occasioned by the static and dynamic inertial forces involved.

Having thus described my invention, I claim:

1. A turret and indexing mechanism comprising a support, a turret rotatably mounted thereon, an oscillating member mounted on the support for movement relative thereto and to the turret, a driving member mounted on the oscillating member for movement therewith and relative thereto, a reversible piston and cylinder assemblage connected to the driving member and operable to drive the driving member in opposite directions, selectively, along a predetermined path, detent means on the driving member, a cam follower connected to the driving member, a complementary detent receiving means on the turret, a cam mounted on the support and movable relative thereto in opposite directions, and when moved in one direction to a given position, bearing against the follower and thereby holding the detent means in cooperative relation to the complementary detent receiving means during movement of the driving member in the indexing direction and when moved in the opposite direction to another position, releasing the follower for permitting release of the detent means from the detent receiving means during movement of the driving member in the opposite direction, power means connected to the cam and operable to move the cam in said opposite directions to said positions, selectively, a source of hydraulic fluid under pressure, control means connecting said source to the piston and cylinder assemblage at one side of the piston and also connected so as to vent the assemblage at the opposite side of the piston, throttle means connected to said opposite side and operative to throttle the discharge from said opposite side, and throttle operating means connected to the throttle means and driven in predetermined relation to the rotation of the turret in the indexing direction to increase the degree of throttling, by the throttle means progressively in minute increments as the turret approaches final indexed position.

2. The structure according to claim 1 wherein means in addition to the throttle means are provided and are operative to yieldably resist rotation of the turret as the turret approaches said final indexed position.

3. The structure according to claim 2 wherein the power means for the cam is an auxiliary piston and cylinder assemblage, said piston and cylinder assemblage is operative when its piston is moved, by hydraulic pressure fluid applied to one side of the piston, from a source, in one direction relative to its cylinder to move the cam to said operative position, and said additional means includes a portion of the operating surface on the cam engaging said follower and operative to drive the piston of the assemblage, by the turret through the driving member and cam, in the opposite direction against hydraulic pressure fluid at said one side of the piston.

4. The structure according to claim 1 wherein said throttle means includes an operating stem and is variable to increase the degree of throttling by movement of the stem in one direction, a throttle control cam is provided which is rotatable in fixed relation to the rotation of the turret and which engages and operates the stem in said direction in relation to the rotated position of the control cam in the indexing direction.

5. A turret and indexing mechanism comprising a support, a turret rotatably mounted thereon, an oscillating member mounted on the support for movement relative thereto and to the turret, a driving member mounted on the oscillating member for movement therewith and relative thereto, a reversible piston and cylinder assemblage connected to the driving member and operable to drive the driving member in opposite directions, selectively, along a predetermined path, detent means on the driving member, a cam follower connected to the driving member, complementary detent receiving means on the turret, a cam mounted on the support and movable relative thereto in opposite directions, and when moved in one direction to a given position, bearing against the follower and thereby holding the detent means in cooperative relation to the complementary detent receiving means during movement of the driving member in the indexing direction and when moved in the opposite direction to another position, releasing the follower for permitting release of the detent means from the detent receiving means during movement of the driving member in the opposite direction, power means connected to the cam and operable to move the cam in said opposite directions to said positions, selectively, control means operable to connect the assemblage at one side of the piston to a source of hydraulic fluid under pressure and to vent the assemblage at the opposite side of the piston, throttle means connected to said opposite side and operative to throttle the discharge from said opposite side, said cam having an operative surface which, when the cam is in operative position, engages with the follower and, acting through the follower, holds the detent receiving means under seating pressure, and thereby in fixed relation to the turret, as the turret is driven in the indexing direction, and said surface having a portion which is trailing in the indexing direction and which engages the follower and is shaped to increase the seating pressure progressively as the turret approaches final indexed position, and fluid pressure operated power means are provided for holding the cam in operative position under yielding pressure.

6. The structure according to claim 5 wherein the said cam surface portion is positioned so that it converges relative to the path of movement of the said detent means in a direction for movement of the turret toward final position, the follower and detent means are movable transversely of said path by said surface portion for seating, and the follower is disposed between said detent means and said cam surface portion is in engagement with said surface portion.

7. The structure according to claim 6 wherein the turret and detent receiving means are rotatable as a unit about a fixed axis, the driving member is rotatable about said axis, the detent means and follower are movable relative to the driving member toward said axis to effect said seating of said detent means in the detent receiving means, the cam extends about said axis, and said surface portion of the cam is of diminishing radius about the axis in the indexing direction of said turret.

References Cited in the file of this patent

UNITED STATES PATENTS

| 2,588,977 | Gartner | Mar. 11, 1952 |
| 2,660,895 | Waters | Dec. 1, 1953 |
| 2,663,193 | Tucker | Dec. 22, 1953 |
| 2,916,923 | Smith | Dec. 15, 1959 |
| 2,938,394 | Latch | May 31, 1960 |
| 3,085,452 | Thompson | Apr. 16, 1963 |

FOREIGN PATENTS

| 454,575 | France | Apr. 30, 1913 |